United States Patent

Takashi

[11] Patent Number: 5,092,442
[45] Date of Patent: Mar. 3, 1992

[54] CLUTCH COVER ASSEMBLY

[75] Inventor: Yukihisa Takashi, Toyoake, Japan

[73] Assignee: Aisin Seiki Kabushiki Kaisha, Kariya, Japan

[21] Appl. No.: 661,320

[22] Filed: Feb. 27, 1991

[30] Foreign Application Priority Data

Feb. 28, 1990 [JP] Japan ................................ 2-20804

[51] Int. Cl.$^5$ ............................................. F16D 13/44
[52] U.S. Cl. ................................ 192/70.27; 192/89 B
[58] Field of Search ............... 192/70.27, 89 B, 109 R

[56] References Cited

U.S. PATENT DOCUMENTS

| 4,520,913 | 6/1985 | Maucher et al. | 192/70.27 X |
| 4,558,771 | 12/1985 | Despres | 192/89 B |
| 4,602,708 | 7/1986 | Nagano | 192/70.27 |
| 4,738,344 | 4/1988 | Maruyamano et al. | 192/109 R |
| 4,787,492 | 11/1988 | Ball et al. | 192/70.27 X |

FOREIGN PATENT DOCUMENTS 62-56832  4/1987  Japan .
2197920  11/1987  United Kingdom ............ 192/109 R Primary Examiner—Leslie A. Braun
Assistant Examiner—Nicholas Whitelaw
Attorney, Agent, or Firm—Oblon, Spivak, McClelland, Maier & Neustadt

[57] ABSTRACT

A clutch cover assembly includes a cover connected to an input drive member, a pressure plate arranged in and connected to the cover, a clutch disk disposed between the pressure plate and the input drive member, a diaphragm spring disposed between the cover and the pressure plate and biasing the pressure plate in the direction of the clutch disk, and a stopper provided at an inward bent portion of the cover and preventing the diaphragm spring from moving in the direction of the clutch disk by more than a certain stroke. The diaphragm spring is prevented from pressing on the clutch disk when the clutch facing is damaged.

6 Claims, 4 Drawing Sheets

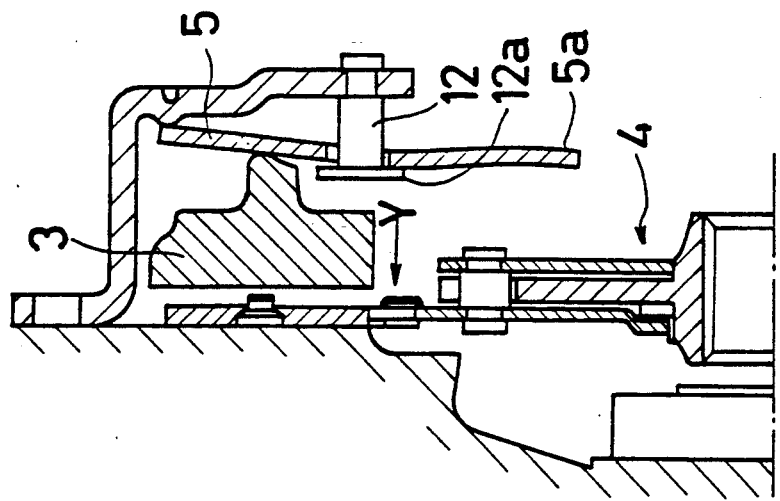
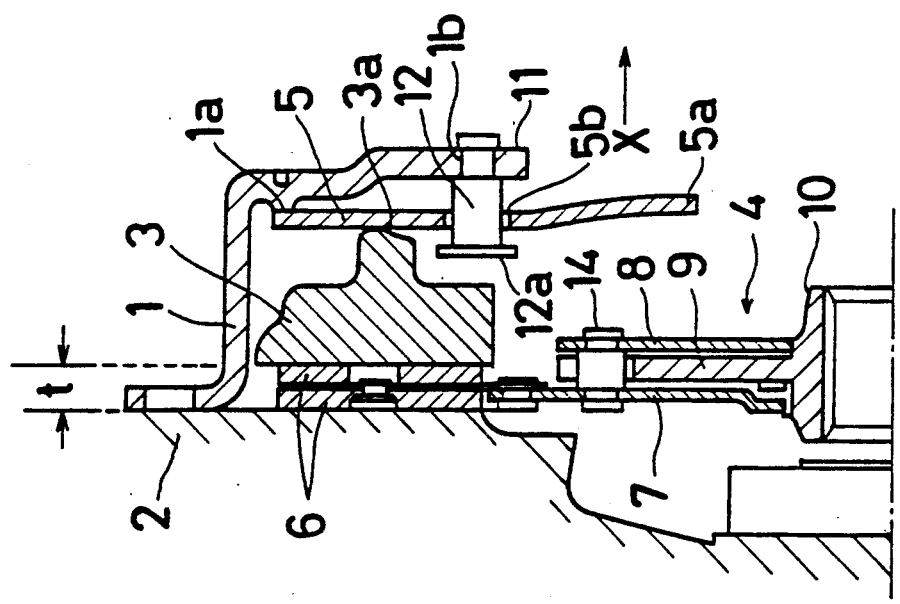

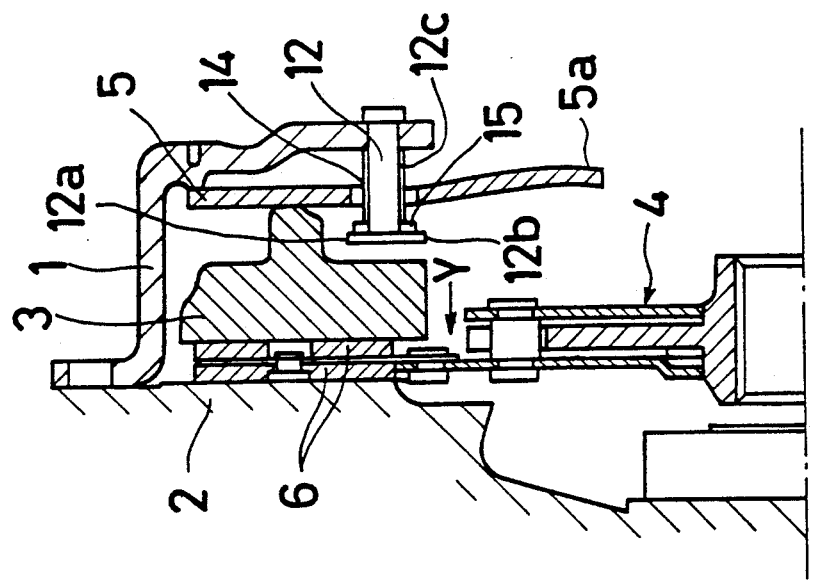

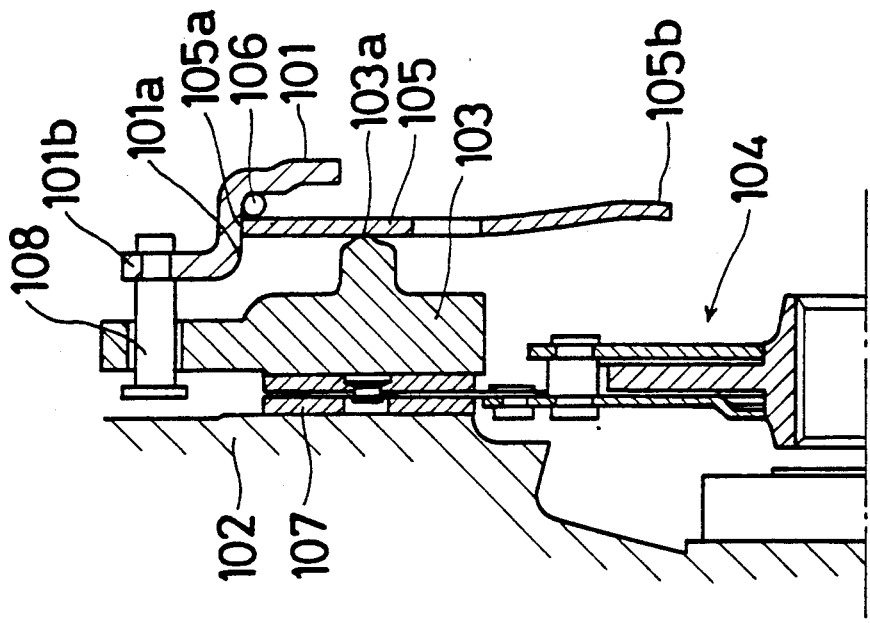
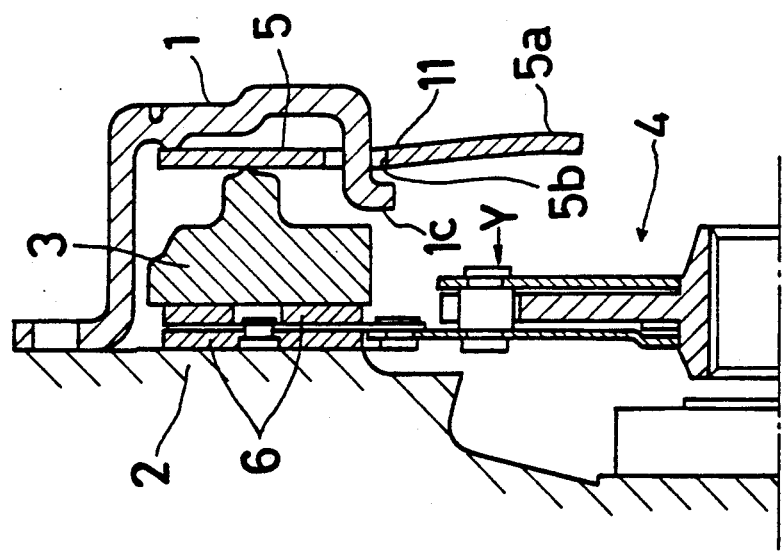

CLUTCH COVER ASSEMBLY

BACKGROUND OF THE INVENTION

1. Field of the Invention

This invention relates to a clutch cover assembly for an automotive vehicle or the like, and more particularly to a clutch cover assembly which includes a diaphragm spring.

2. Description of the Related Art

A conventional clutch cover assembly is disclosed in FIG. 8. This conventional art shown in Japanese Utility Model Laid Open Print No. 6256832, includes a cover 101 connected to an input delve member 102, a pressure plate 103 arranged in and connected to the cover 101, a clutch disk 104 disposed between the pressure plate 103 and the input drive member 102 and connected to an output driven member (not shown), and a diaphragm spring 105 disposed between the cover 101 and the pressure plate 103 wherein the pressure plate 103 is biased into the direction of the clutch disk 104.

However, the diaphragm spring 105 is radially positioned by contacting with an inner wall surface 101a of the cover 101. Therefore, an outer peripheral surface 105a of the diaphragm spring 105 must be cut so as to position a center thereof accurately. Thus, the positioning of the center of the diaphragm spring 105 is very difficult.

Also, when a facing 107 of the clutch disk 104 is worn or damaged, the pressure plate 103 is moved in the direction of the clutch disk 104 by the spring force of the diaphragm spring 105. The diaphragm spring 105 is also moved in the direction of the clutch disk 104 by the spring force thereof. Thereby, an inner peripheral portion 105b of the diaphragm spring 105 contacts the clutch disk 104 and presses it against the input drive member 102 even when the facing 107 is worn away. Thus, the clutch disk 104 is damaged. In order to avoid this problem, a stopper 108 which is provided on an outer peripheral portion 101b of the cover 101 prevents the movement of the pressure plate 103 in the direction of the clutch disk 104 by more than a certain amount. However, the stopper 108 requires a large radial space.

SUMMARY OF THE INVENTION

It is an object of the invention to provide an improved clutch cover assembly which obviates the above-described drawbacks.

In order to accomplish the object, a clutch cover assembly is comprised of a cover connected to an input drive member, a pressure plate arranged in and connected to the cover, a clutch disk disposed between the pressure plate and the input drive member, a diaphragm spring disposed between the cover and the pressure plate and biasing the pressure plate in the direction of the clutch disk and a stopper means provided at an inward bent portion of the cover and preventing the diaphragm spring from moving in the direction of said clutch disk more than by a certain stroke such that the pressure plate does not engage the clutch disk when the clutch disk is worn.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a partially cross sectional view illustrated an embodiment of the invention;

FIG. 2 shows a partially cross sectional view of the condition where a clutch facing is damaged;

FIG. 3 shows a partially cross sectional view illustrating another embodiment of the invention.

FIG. 6 shows a partially cross sectional view illustrating another embodiment of the invention;

FIG. 7 shows a partially cross sectional view illustrating yet another embodiment of the invention; and FIG. 8 shows a partially cross sectional view illustrating a clutch cover assembly of the Related Art.

DESCRIPTION OF THE PREFERRED EMBODIMENTS

Figure 4:
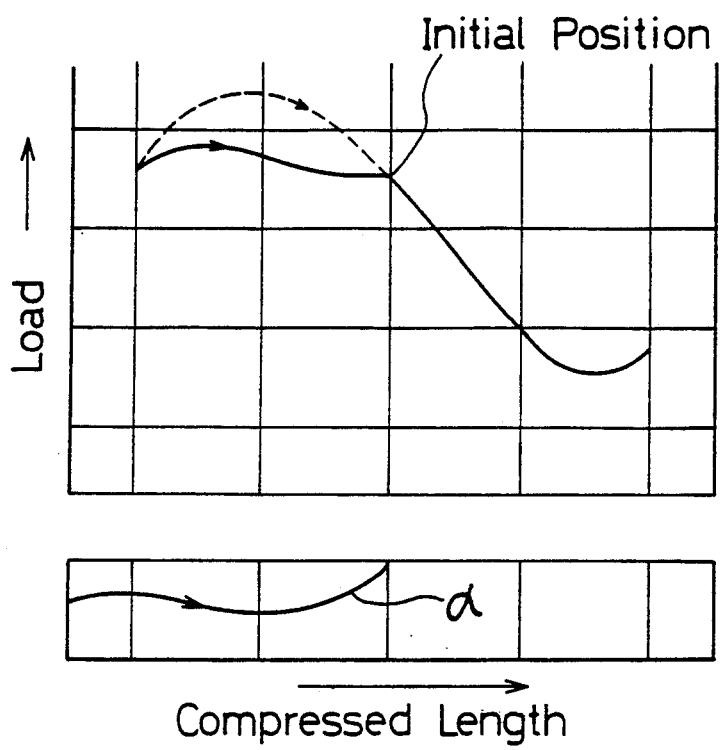
FIG. 4 shows a graph of the load characteristic of a diaphragm spring and a return spring of the invention.

Referring to FIG. 1, a clutch cover assembly includes a cover which is fixedly connected to a flywheel 2, as an input drive member via a plurality of rivets (not shown). A pressure plate 3 is arranged in the cover 1 and is connected to the cover 1 at an outer peripheral portion of the pressure plate 3 by a plurality of rivets (not shown). A clutch disk 4 is disposed between the pressure plate 3 and the flywheel 2 and is rotatably connected to an output driven member (not shown). A diaphragm spring 5 is disposed between the pressure plate 3 and the cover 1 for continuously biasing the pressure plate 3 in the direction of the clutch disk 4.

The diaphragm spring 5 is pressed between an outer fulcrum portion 1a which is provided on the cover 1 and an inner fulcrum portion 3a which is located radially inward of the outer fulcrum portion 1a. The outer fulcrum portion 1a is formed in a shape which projects from the cover 1 and is attached to one surface of the diaphragm spring 5. The inner fulcrum portion 3a is formed in a shape which projects from the pressure plate 3 and is attached to the other surface of the diaphragm spring 5. A plurality of equally pitched holes 5b are provided on the periphery of the diaphragm spring 5.

A plurality of rivets 12 are fixedly connected to the inward bent portion 11 of the cover 1 and are fitted into the plurality of holes 5b, respectively. One end of each rivet 12 is provided with a flange 12a. The flange 12a serves for limiting the stroke of the diaphragm spring 5. In this case, the distance between the flange 12a and the diaphragm spring 5 is set at "t". The distance "t" is the axial width of the clutch facing 6 of the clutch disk 4. Therefore the distance between the flange 12a and the diaphragm spring 5 is set so as to prevent the inner peripheral portion 5a of the diaphragm spring 5 from contacting with the clutch disk 4 when the clutch facing 6 is worn or damaged. Also, the diaphragm spring 5 is radially positioned and prevented from rotating by the rivets 12.

The operation of the above-described embodiment will be described below.

The clutch facing 6 is continuously engaged with the flywheel 2 and the pressure plate 3 by the spring force of the diaphragm spring 5. As a result, the engine torque is transmitted to the outer driven member through the clutch disk 4 which is comprised of a disk plate 7, a sub plate 8, a flange 9, a rivet 14 and a hub 10 as well known.

On the other hand, when the diaphragm spring 5 is moved in the direction of arrow X by a release device (not shown), the clutch facing 6 is disengaged from the flywheel 2 and the pressure plate 3.

As illustrated in FIG. 2, if the clutch facing 6 is damaged, the pressure plate 3 is moved in the direction of arrow Y by the spring force of the diaphragm spring 5. At the same time, the diaphragm spring 5 is also moved in the direction of the arrow Y. However, the inner portion 5a of the diaphragm spring 5 is stopped by the flange 12a of the rivet 12. Thus, the flange 12a prevents the diaphragm spring 5 from pressing on the clutch disk 4. Consequently, the clutch disk 4 is not damaged. Also, since the rivet 12 is provided on the inward bent portion 11 of the cover 1, a large radial space is not required therefor.

FIG. 3 shows another embodiment of the invention. A plurality of rivets 12 are fixedly connected to the inward bent portion of the cover 1 and are fitted into the hole 5b of the diaphragm spring 5. A return spring 13 is disposed between the diaphragm spring 5 and the rivets 12. One end of the return spring 13 is located at a base portion 12b of each rivet 12. On the other hand, the other end of the return spring 13 is elastically attached to the one surface of the diaphragm spring 5.

Figure 5:
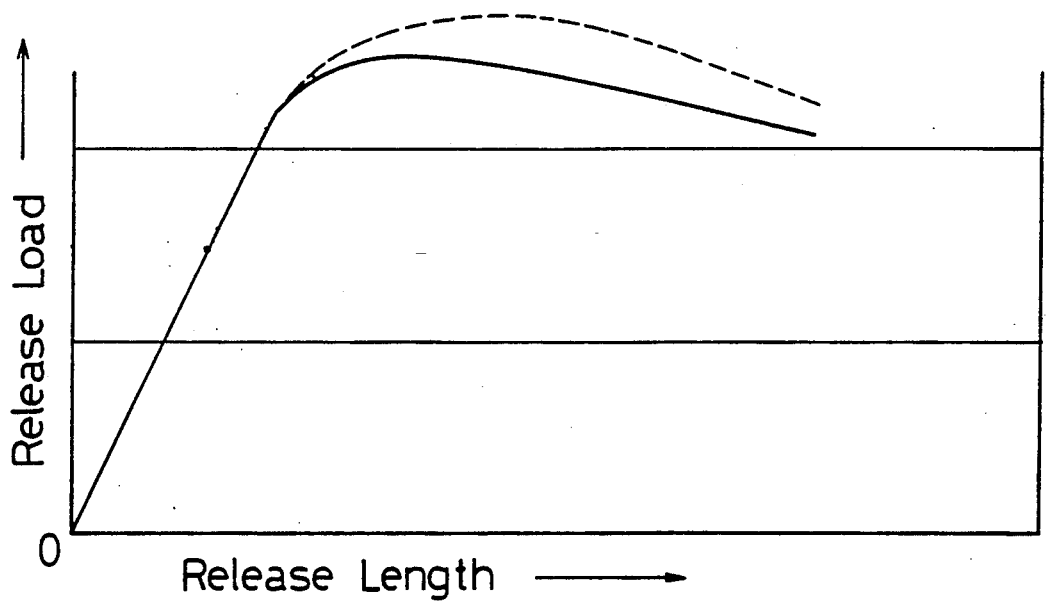
FIG. 5 shows a graph of the release load characteristic of the invention.

In FIG. 4 and FIG. 5, the solid line represents the load characteristics of the diaphragm spring according to this embodiment of the invention and the dash line represents that of the Related art of FIG. 8. In the invention, the load of the diaphragm spring 5 is decreased by the load characteristic "a" of the return spring 13 as represented by the solid line, because the return spring 13 prevents the diaphragm spring 5 from moving toward the clutch disk 4 by the spring force thereof according to the wear of the clutch facing 6. Therefore, as illustrated in FIG. 5, a release load is decreased. Thus, a heavy depression force for the clutch pedal (not shown) is not required.

When the clutch facing 6 is damaged, the pressure plate 3 is biased in the direction of an arrow Y by the spring force of the diaphragm spring 5. At the same time, the diaphragm spring 5 is also biased in the direction of the arrow Y. However, the stroke of the inner portion 5a of the diaphragm spring 5 is limited by the return spring 13. Thus, the return spring 13 prevents the diaphragm spring 5 from pressing on the clutch disk 4.

FIG. 6 shows a third embodiment of the invention. A plurality of rivets 12 are fixedly connected to the inward bent portion of the cover 1 and are fitted into the hole 5b of the diaphragm spring 5. A collar 14 is disposed between the cover 1 and a washer 15 abuts the flange 12a provided on one end of each rivet 12, and is assembled on the surface of the extended portion 12c of the rivet 12. Thereby, the stroke of the return spring is limited by its engagement with the washer and the rivet 12 is prevented from moving by the collar 14. The stroke limit of the diaphragm spring 5 may be adjusted by changing the width of the washer.

When the clutch facing 6 is damaged, the pressure plate 3 is biased in the direction of an arrow Y by the spring force of the diaphragm spring 5. At the same time, the diaphragm spring 5 is also biased in the direction of the arrow Y. However, the stroke of the inner portion 5a of the diaphragm spring 5 is limited by the washer 15.

FIG. 7 shows another embodiment of the invention. Each top end portion 1c of the inward bent portion 11 of the cover 1 is bent in a crank shape and is fitted into one of a plurality of holes 5b which are formed on the diaphragm spring 5.

When the clutch facing 6 is damaged, the pressure plate 3 is biased in the direction of an arrow Y by the spring force of the diaphragm spring 5. At the same time, the diaphragm spring 5 is also biased in the direction of the arrow Y. However, the stroke of the inner portion 5a of the diaphragm spring 5 is limited by the top end portion 1c.

It should be apparent to one skilled in the art that the above-described embodiments are merely illustrative of but a few of the many possible specific embodiments of the present invention. Numerous and various other arrangements can be readily devised by those skilled In the art without departing from the spirit and scope of the invention as defined in the following claims.

What is claimed as new and desired to be secured by Letters Patent of the United States is:

1. A clutch cover assembly comprising:
   a cover connected to an input drive member;
   a pressure plate arranged in and connected to said cover;
   a clutch disk disposed between said pressure plate and said input drive member;
   a diaphragm spring disposed between said cover and said pressure plate and biasing said pressure plate in the direction of said clutch disk; and
   stopper means secured to a radially inward portion of said cover for limiting a stroke of said diaphragm spring in the direction of said clutch disk such that said pressure plate does not engage said clutch disk when said clutch disk is worn.

2. A clutch cover assembly according to claim 1, wherein said stopper means includes at least one rivet fixedly connected to an inward bent portion of said cover and fitted into a hole of said diaphragm spring, each said rivet having a flange positioned for stopping the movement of said diaphragm spring.

3. A clutch assembly according to claim 1, wherein said stopper means includes at least one rivet having a flange and being fixedly connected to an inward bent portion of said cover, each said rivet being fitted into a hole of said diaphragm spring, including a return spring disposed between said diaphragm spring and said flange for limiting the movement of said diaphragm spring.

4. A clutch cover assembly according to claim 1, wherein said stopper means includes at least one rivet having a flange and being fixedly connected to said inward bent portion of said cover, each said rivet being fitted into a hole of said diaphragm spring, including a washer disposed between said diaphragm spring and said flange for limiting the movement of said diaphragm spring.

5. A clutch cover assembly according to claim 1, wherein said stopper means includes a top end portion of an inward bent portion of said cover which is bent in a crank shaped and fitted into a hole of said diaphragm spring.

6. A clutch cover assembly according to claim 2, wherein each said rivet has such a length that said flange engages said diaphragm spring to stop movement of said diaphragm spring when said clutch disk is worn.

* * * * *